US010491641B2

(12) United States Patent
Mufti et al.

(10) Patent No.: US 10,491,641 B2
(45) Date of Patent: Nov. 26, 2019

(54) INTER-IMS SERVICE SUPPORT IN TELECOMMUNICATION SYSTEMS (71) Applicant: T-Mobile USA, Inc., Bellevue, WA (US)

(72) Inventors: Shujaur Mufti, Snoqualmie, WA (US);
Saqib Badar, Bellevue, WA (US);
Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 255 days.

(21) Appl. No.: 15/047,439

(22) Filed: Feb. 18, 2016

(65) Prior Publication Data
US 2016/0248814 A1 Aug. 25, 2016

Related U.S. Application Data (60) Provisional application No. 62/118,986, filed on Feb. 20, 2015.

(51) Int. Cl.
H04L 29/06 (2006.01)
H04L 29/08 (2006.01)

(52) U.S. Cl.
CPC ...... H04L 65/1006 (2013.01); H04L 65/1016 (2013.01); H04L 65/1036 (2013.01);
(Continued)

(58) Field of Classification Search
CPC ............. H04L 65/1006; H04L 65/1016; H04L 65/1069; H04L 67/30
See application file for complete search history.

(56) References Cited

U.S. PATENT DOCUMENTS

2005/0091435 A1* 4/2005 Han .................... G06F 9/54
710/310
2006/0239247 A1* 10/2006 Postmus ........... H04L 29/06027
370/352
(Continued)

FOREIGN PATENT DOCUMENTS

KR 1020080043266 5/2008
WO WO2014086433 A1 6/2014

OTHER PUBLICATIONS

Official Document IR.90—RCS Interworking Guidelines v10.0, GSM Association, Oct. 14, 2014, 50 pages.
(Continued)

Primary Examiner — Joe Chacko
(74) Attorney, Agent, or Firm — Lee & Hayes, P.C.

(57) ABSTRACT

A first communication provider supports an IP multimedia subsystem (IMS) having a border session control function (BGCF) that receives SIP requests. The SIP requests correspond to different SIP methods and specify various feature tags. The feature tags correspond to available services or media types that may be available from the IMS of a second communication provider. When receiving a SIP request that addresses a user supported by the second communication provider, the BGCF of the first communication provider checks the method and feature tag of the SIP request to make sure that they are supported by IMS of the second communication provider. If they are not, the SIP is rejected and a failure message is returned. The BGCF may also modify certain parameters of the SIP request, such as by removing one or more offered codecs or preconditions.

20 Claims, 5 Drawing Sheets (52) U.S. Cl.
CPC .......... *H04L 65/1069* (2013.01); *H04L 67/30* (2013.01); *H04L 67/327* (2013.01); *H04L 69/24* (2013.01)

(56) References Cited

U.S. PATENT DOCUMENTS

| | | |
|---|---|---|
| 2007/0071221 A1 | 3/2007 | Allen et al. |
| 2008/0031227 A1 | 2/2008 | Wang |
| 2008/0162637 A1* | 7/2008 | Adamczyk ............ H04L 51/043 709/204 |
| 2008/0259907 A1 | 10/2008 | Kumarasamy et al. |
| 2009/0059894 A1* | 3/2009 | Jackson ............ H04L 29/12896 370/352 |
| 2011/0069702 A1* | 3/2011 | Oktay ................ H04L 65/1046 370/352 |
| 2011/0231540 A1 | 9/2011 | Tai et al. |
| 2015/0043453 A1* | 2/2015 | Hegarty ............. H04L 65/1016 370/329 |

OTHER PUBLICATIONS

The PCT Search Report and Written Opinion dated Jun. 2, 2016 for PCT application No. PCT/US2016/018662, 14 pages.
The Extended European Search Report dated Nov. 30, 2018, for European Patent Applcation No. 16753140.9, 9 pages.

* cited by examiner

INTER-IMS SERVICE SUPPORT IN TELECOMMUNICATION SYSTEMS

CROSS-REFERENCE TO RELATED APPLICATIONS

This application is a nonprovisional application of, and claims priority to and the benefit of, U.S. Provisional Patent Application Ser. No. 62/118,986, filed Feb. 20, 2015 and entitled "IMS NNI," the entirety of which is incorporated herein by reference.

BACKGROUND

Modern cellular communication networks often include IP Multimedia Subsystems (IMSs) for delivering IP multimedia services. In many situations, however, users who are attempting to communicate with each other may be supported by different communication providers, so that multimedia calls and communications need to be set up between IMS systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods that allow services to be provided between IP multi-media subsystems (IMSs) of different communication providers. In certain described embodiments, a session initiation protocol (SIP) request corresponds to one of several methods, which may include INVITE, SUBSCRIBE, OPTIONS, NOTIFY, PUBLISH, and REFER methods. Each SIP request may also specify a feature tag, which corresponds to and designates a particular type of communication service or media. The feature tags may indicate features such as, but not limited to, multimedia telephony (MMTEL) features, short message session initiation protocol (SMSIP) features, rich communication services (RCS) features, and the like.

In embodiments described herein, the IMS of a communication provider includes a border gateway control function (BGCF) that is responsible for forwarding SIP messages to external IMSs, such as IMSs of other communication providers. When receiving a SIP request that is addressed to an external IMS, the BGCF determines whether the request corresponds to a method that is supported by the external IMS. The BGCF also determines whether any specified feature tag is supported by the external IMS. If the either the method or the feature tag are not supported, a failure response is generated. Otherwise, the SIP request is forwarded to the external IMS.

In some cases, the BGCF may modify a SIP request to comply with capabilities or limitations of the external IMS. For example, the BGCF may add or remove certain codecs from the SIP request. As another example, the BGCF may alter routing information that is present in the SIP request, such as by adding information of a particular server that should receive a SIP request having a particular feature tag. The BGCF may also alter precondition requirements that are specified in the SIP request.

In some cases, the SIP request may be received from the external network. In this case, the BGCF may perform similar actions before forwarding the request on to an application server. For example, the BGCF may determine whether the request method and feature tag are supported, and may reject the request if the method and feature tag are not supported. The BGCF may also add routing information to the SIP request and may change specifications such as offered codecs and precondition requirements.

Figure 1:
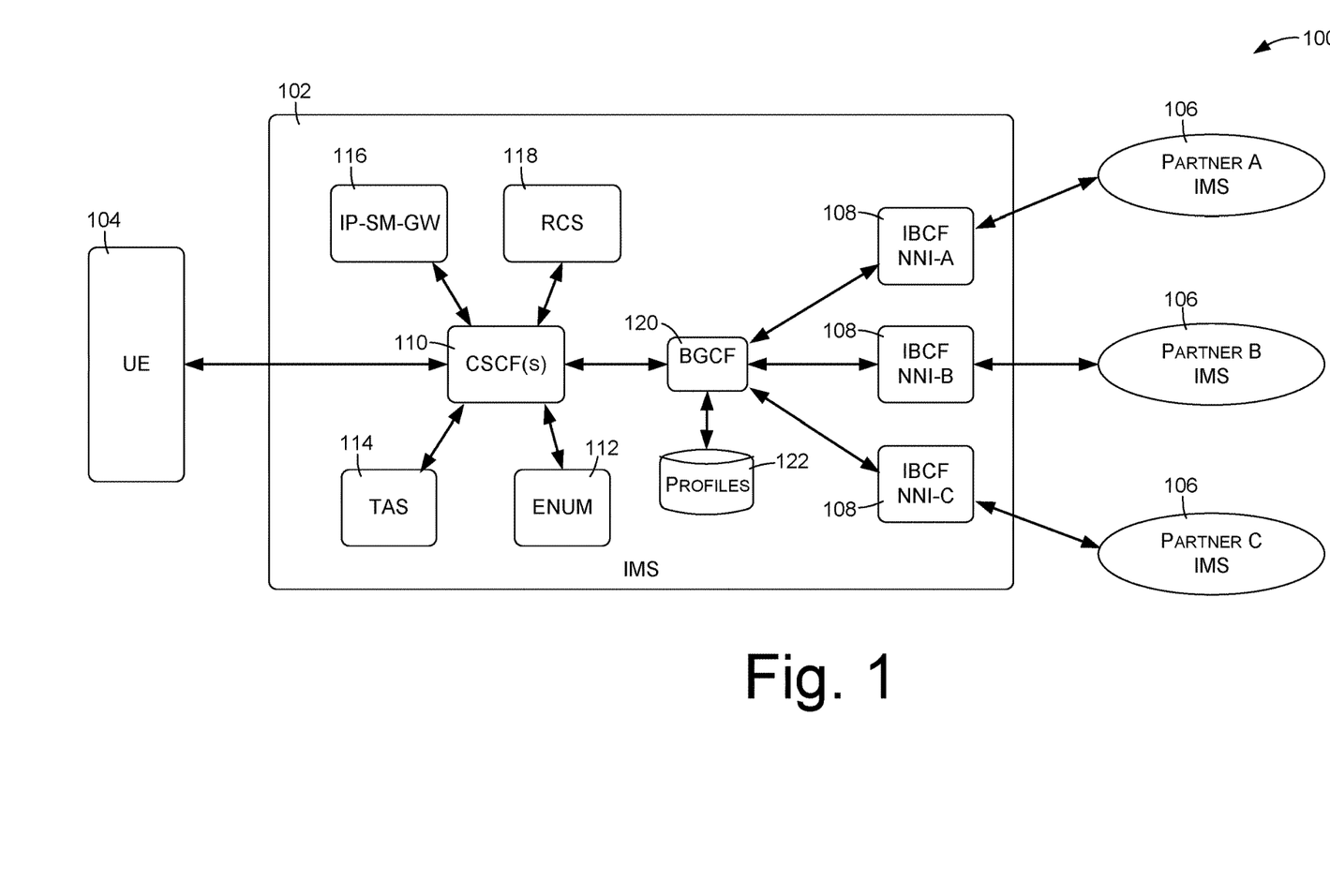
FIG. 1 is a block diagram illustrating a communication system that includes multiple IMS networks operated by different communication providers.

FIG. 1 illustrates an example telecommunication system 100, which may be provided and/or supported by a telecommunications service provider. The system 100 includes an Internet Protocol (IP) Multimedia Subsystem (IMS) 102 that provides communications between multiple user equipment (UE) devices 104 (referred to simply as UE 104 in the following discussion). Communications may be between UEs of the same service provider and/or may be between UEs supported by different service providers. In this example, the illustrated UE 104 receives communication services from a first cellular service provider that implements the illustrated IMS 102. The IMS 102 may also provide communications to equipment supported by other service providers, referred to as partner providers or peering partners, which may comprise other cellular providers or carriers. Each of the partner providers may have a corresponding IMS 106, each of which may communicate with the IMS 102 through various types of media and gateways. The IMSs 106 of the partner providers will be referred to as partner IMSs herein.

The UE 104 comprises a communication device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. The UE 104 may also comprise a non-mobile computing device. Examples of non-mobile UEs may include such things as televisions, desktop computers, a game consoles, set top boxes, home automation components, security system components, and so forth. In this sense, the terms "communication device," "wireless device," "wireline device," "mobile device," "computing device," and "user equipment (UE)" may be used interchangeably herein to describe any communication device capable of performing the techniques described herein. Furthermore, the UE 104, as well as the various network provider components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

The UE 104 communicates with the IMS 106 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

The UE 104 may be configured to initiate a communication session, such as a voice call, a video call, or another sort of synchronous communication. Initiation of such communications may involve communication clients and session initiation protocol (SIP) clients to communicate with components of the IMS 102. When communicating with the IMS 102, for example, the UE 104 may transmit SIP requests that are received by the IMS 102. A SIP request may invoke a particular SIP method and may include a feature tag that specifies one or more media types that are the subject of the request. Features or media types specified by feature tags may include multimedia telephony (MMTEL), short message session initiation protocol (SMSIP) communications, rich communication services (RCS), and so forth.

The IMS 102 has various components, of which only those most relevant to the current discussion are shown in FIG. 1. The IMS 102 may communicate with the partner IMSs 106 over various type of networks, including wired and/or wireless networks, and including private and/or public networks. The IMS 102 and each of the partner IMSs 106 provide one or more interconnect border control functions (IBCFs), which function as gateways between provider networks. For example, an IBCF 108 of the IMS 102 may provide communications with an IBCF (not shown) of a partner IMS 106.

Further components of the IMS 102 include one or more call session control functions (CSCFs) 110 that receive and process SIP requests and that perform call session control. The CSCFs 110 may include a serving CSCF (S-CSCF), an interrogating CSCF (I-CSCF), and a proxy CSCF (P-CSCF), which work together to receive and respond to call requests, to communicate with application servers, and to implement other functionality as defined by IMS protocols and standards.

The IMS 102 may include an ENUM server 112, which provides a service that maps telephone numbers to SIP user identities. A SIP user identity comprises a username and a corresponding domain or host name. For example, a SIP user identity may comprise something such as "alice@myhost.com" where "alice" is a username of a user and "myhost.com" specifies or corresponds to the domain of the user, and/or to the IMS of the partner provider that support the UE of the user. The host name may comprise a uniform resource identifier (URI), as a further example.

The IMS 102 may support various types of communication and media services. In the illustrated example, the IMS 102 includes a telephony access server 114 that provides voice communication services. The IMS 102 also includes or supports an IP short message gateway (IP-SM-GW) 116, which is a service for communicating short messages, such as short message service (SMS) over IP (SMSIP) messages, between UEs. The IMS 102 also includes or supports the Rich Communication Suite (RCS) 118, which is a platform that supports various types of media communications, including one-to-one chat, group chat, file transfer, content sharing, voice calling, video calling, social presence, video calling, geolocation exchange, service identification, notifications, and others. Each of these services may be implemented by one or more corresponding application servers that form part of the IMS 102.

In addition to the components described above, the IMS 102 may have a border gateway control function (BGCF) 120, which is the IMS component responsible for routing SIP requests to the partner IMSs 106. The BGCF 120 may function as or may at times be referred to as a SIP routing engine (SRE). Note that the BGCF 120 may be considered to be part of the CSCF 110 in some implementations.

The IMS 102 maintains a service profile database 122 that is used by the BGCF 120 to determine characteristics and capabilities of partner providers and partner IMSs 106. The service profile database 122 contains a service profile for each of the partner IMSs 106. Each service profile indicates capabilities of the corresponding partner IMS 106, such as methods supported, multimedia services supported, and other supported capabilities of the partner IMS 106. The service profile may also indicate routing information for each partner IMS. For example, the service profile may indicate URIs of particular servers that the partner IMS uses for processing communications relating to particular types of services.

In operation, the CSCF 110 receives SIP requests that are generated by the UE 104 and/or by other components of a provider network. Each SIP request corresponds to a SIP method, such as an INVITE method, a SUBSCRIBE method, an OPTIONS method, a NOTIFY method, a PUBLISH method, a REFER method, etc.

Each SIP request may include headers and/or other information that specify characteristics of the media to which the SIP request relates as well as various communication parameters or options. For example, the SIP request may contain a feature tag that corresponds to and specifies a specific type of media or service, such as voice, chat, file transfer, etc. The SIP request may also specify one or more offered codecs that may be used for subsequent communications. The SIP request may also specify other parameters such as preconditions that are to be established prior to establishing end-to-end communications between UEs.

Upon receiving a SIP request, the CSCF 110 calls the ENUM 112 to determine a request URI (R-URI), which indicates the domain or host name of a partner IMS 106 to which the call is to be directed. The SIP request is then forwarded to the BGCF 120 for forwarding to the appropriate partner IMS 106.

Based on the R-URI, the BGCF 120 accesses the service profiles database 122 and finds the service profile that is indexed by a URI that matches the R-URI. As described above, this service profile specifies known and/or preconfigured information about the partner provider and its IMS 106.

Prior to forwarding the SIP request to the partner IMS 106, the BGCF 120 determines whether the request method of the SIP request is supported by both the IMS 102 and the partner IMS 106. If the request method is not supported by either the IMS 102 or the partner IMS 106, the SIP request is rejected and a SIP failure response is returned to the requesting entity. Similarly, the BGCF 120 determines whether the specified feature tag corresponds to an application or service that is supported by the partner IMS 106. If the specified feature tag does not correspond to an application or service that is supported by the partner IMS 106, the SIP request is rejected and a SIP failure response is returned to the requesting entity. Otherwise, the SIP request is forwarded to the IMS specified by the R-URI.

The BGCF 120 may also modify certain parameters of a received SIP request based on the service profile corresponding to the partner IMS 106. For example, the BGCF 120 may add or remove one or more codec specifications from the SIP request. As another example, the BGCF 120 may alter a specified requirement for preconditions, and/or may disable a preconditions requirement. As another example, the BGCF 120 may add routing information or indicators to the R-URI of the received SIP request in order to specify how to subsequently route the SIP request. For example, an added routing indicator may specify that the SIP request is to be forwarded to a particular IBCF of a partner IMS 106, where the IBCF is intended by the partner provider to receive SIP request corresponding to certain methods or having certain feature tags.

Figure 2:
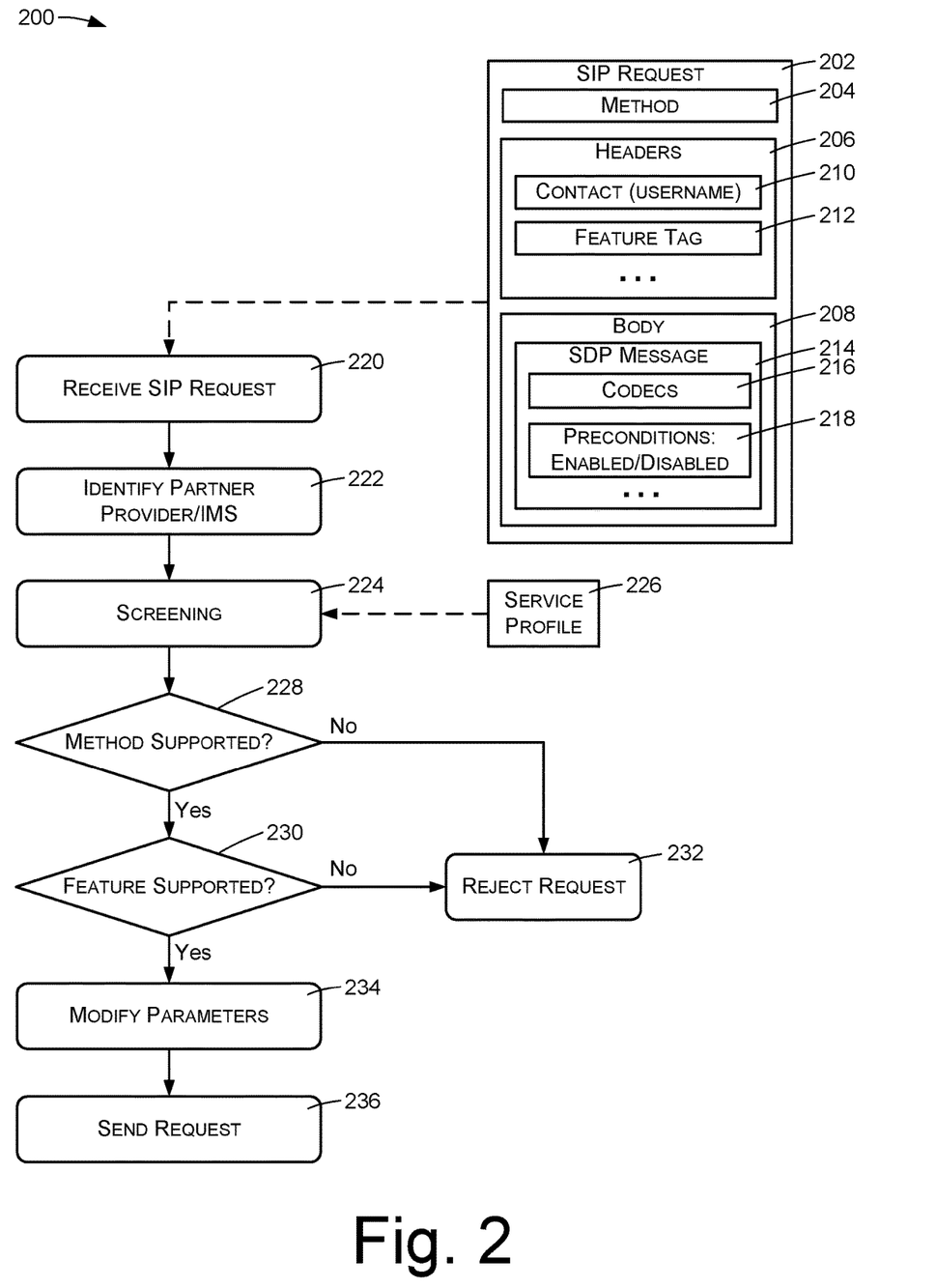
FIG. 2 is a flow diagram illustrating an example method of providing services between different IMS networks.

FIG. 2 illustrates an example method 200 of processing a SIP request 202. The SIP request 202 may correspond to a SIP method 204, which may comprise any one of an INVITE method, a SUBSCRIBE method, an OPTIONS method, a NOTIFY method, a PUBLISH method, or a REFER method. The SIP request may have multiple headers 206 and a body 208.

The headers 206 of the SIP request 202 may specify various types of information. Most relevant to the current discussion, the headers 206 specify a contact 210 and a feature tag 212. The contact 210 may comprise a username or other designator. In some cases, the contact 210 may be specified in the SIP request 202 as a telephone number.

The feature tag 212 may correspond to an RCS media type or other media type that is the subject of the SIP request 202. For example, the feature tag 212 may correspond to any one of the following, among others: one-to-one chat, group chat, file transfer, content sharing, voice calling, video calling, social presence, video calling, geolocation exchange, service identification, or notifications.

The body 208 may contain a session description protocol (SDP) message 214 that specifies requested, allowable, and/or offered characteristics of a call that is the subject of the SIP request 202. For example, the SDP message 214 may contain a codec specification 216, indicating offered codecs for use during subsequent voice or video communications. As another example, the SDP message 214 may contain a preconditions specification 218, specifying resources that are to be obtained and/or committed before completing an end-to-end communication session. The preconditions specification 218 may in some cases indicate that the use of preconditions has been either enabled or disabled.

An action 220, which may be performed by any computing device of or associated with the IMS 102, comprises receiving the SIP request 202. The SIP request 202 may be received by the CSCF 110, for example, and then received by the BGCF 120 from the CSCF 110. In addition to the data and information specifically described above, the SIP request 202 also specify additional information.

An action 222, which in the described implementation is performed by the BGCF 120, comprises identifying the partner provider and associated IMS that are associated with the call recipient or other contact 210 specified by the SIP request 202. The action 222 may comprise calling the ENUM service 112 to determine a domain and/or host name associated with the contact 210. The domain may be specified or may correspond to a uniform resource identifier (URI), which in this context is referred to as a request-URI (R-URI). As an example, the R-URI may specify the domain of an IMS that supports a recipient of a communication such as a voice or video call. This domain is referred to herein as the recipient domain, and the corresponding IMS is referred to as the recipient IMS.

An action 224, which in the described implementation is performed by the BGCF 120, comprises screening the SIP request. The screening 224 comprises accessing the service profiles database 122 (FIG. 1) to obtain a service profile 226 corresponding to the R-URI identified in the action 222, and which corresponds to the partner provider and partner IMS 106 to which the SIP request 202 will be directed.

Actions 228 and 230 comprise comparing the request method 204 and the request feature tag 212 to a specification of methods and feature tags that are supported by the recipient domain and/or the partner IMS of the recipient domain. In the described embodiment, this comprises comparing the request method 204 and the request feature tag 212 to methods and feature tags specified by the service profile 226.

More specifically, the action 228 comprises determining whether the request method 204 is one of the supported methods identified by the service profile 226. If the request method 204 is not indicated by the service profile 226 to be supported by the recipient IMS, an action 232 is performed of rejecting the SIP request 202. The action 232 may comprise sending or returning an SIP failure response.

The action 230 comprises determining whether the request feature tag 212 is one of the supported feature tags identified by the service profile 226. If the request feature tag 212 is not indicated by the service profile 226 to be supported by the recipient IMS, the action 232 is performed, which again may comprise sending or returning an SIP failure response.

If the comparisons with the service profile 226 indicate that both the request method 204 and the request feature tag 212 are supported by the recipient IMS, an action 234 may be performed. The action 234 may comprise modifying parameters of the original SIP request 202 in accordance with information specified by the service profile 226. For example, codec specifications may be added or removed to comply with capabilities of the recipient IMS. As another example, preconditions may be changed or disabled when the recipient network does not support the precondition specified by the SIP request 202.

The action 234 may also comprise determining and adding one or more routing indicators to the SIP request 202. The routing indicators may specify different servers or IBCFs of the recipient IMS to which the SIP request 202 should be routed, and may be determined by referencing the service profile 226. For example, the service profile 226 may indicate, for each different SIP method and corresponding feature tag, an IP address or URI to which SIP requests should be routed. In some cases, an appropriate field, prefix, or suffix may be added to an R-URI to designate a particular server to which the SIP request 202 should be routed.

An action 236, which is also performed by the BGCF 120 of the IMS 102, comprises sending the SIP request, with the modifications or additions described above, to the recipient IMS.

Although FIG. 2 has been discussed in the context of a SIP request being received from within the IMS 102 and/or from a UE 104 that is associated with and supported by the cellular network provider of the IMS 102, the same or similar actions may be performed with respect to a SIP request that is received from a partner IMS 106. In this case, the screening 224 may comprise referencing a header 206 of the SIP request 202 to determine the domain of the partner IMS from which the SIP request 202 has been received and accessing the service profiles database 122 (FIG. 1) to obtain the service profile 226 corresponding to the originating partner IMS. The action 228 may comprise determining whether the method 204 of the received SIP request 202 is supported by the IMS 102, and rejecting the request in the action 232 if the method 204 is not supported by the IMS 102. The action 230 may comprise determining whether the feature tag 212 of the received SIP request 202 is supported by the IMS 102, and rejecting the request in the action 232 if the feature tag 212 is not supported by the IMS. The action 234 may comprise modifying parameters of the SIP request 202, such as codecs and precondition specifications, to reflect capabilities or preferred capabilities of the IMS 102. The action 234 may also comprise adding routing information to the SIP request 202 based on the domain and IBCF 106 from which the SIP request 202 was received. For example, a SIP request 202 may be routed differently within the IMS 102 depending on the entity from which the SIP request 202 was received. The action 236 may comprise sending the received SIP request 202 to other components of the IMS 102, such as to the CSCF 110.

Note also that while the techniques described above are described as being implemented by the BGCF 120, the described techniques may alternatively be implemented by the CSCF 110, by one of the IBCFs 108, or by any one or more other components of the IMS 102 as may be appropriate depending on the particular implementation.

Figure 3:
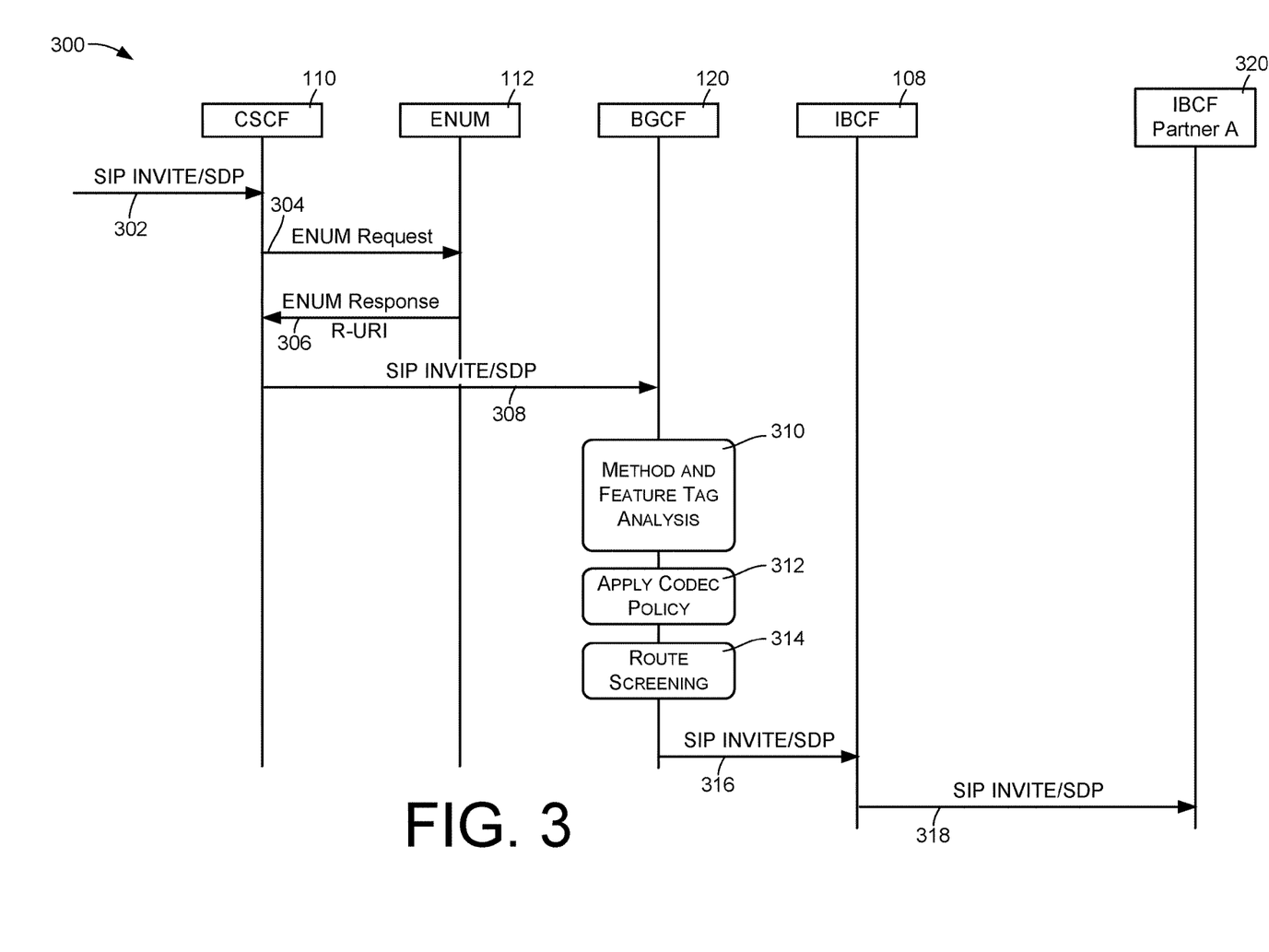
FIG. 3 is a diagram of a call flow between different IMS networks.

FIG. 3 shows an example call flow illustrating reception and forwarding of a session initiation request in the form of a SIP INVITE request 302 with an SDP message body, wherein the request 302 is received from a UE or other client that is supported by the IMS 102. In FIG. 3, boxes across the top and corresponding vertical lines descending from those boxes represent different servers or services of the IMS 102 and/or a partner IMS 106 (collectively "nodes"). Time increases down the page. Arrows between the vertical lines represent messages between nodes. Note that some components and messages are omitted for brevity. Although FIG. 3 illustrates a sequence of communications corresponding to the SIP INVITE method, other SIP methods may be communicated in similar ways.

The SIP INVITE request 302 may contain information such as described above with reference to FIG. 2, such as one or more feature tags, one or more offered codecs, a specification of preconditions, a contact or recipient designation, and so forth.

Each feature tag may correspond to one of various different services, including TAS services, messaging services, RCS services, etc. As examples, services may correspond to tags such as:
 "msg": a standalone message;
 "filetransfer": a file transfer;
 "session": a chat session;
 "largemsg": a large message mode standalone message;
 "mmtel": multimedia telephony;
 "mmtel; video": video.

The CSCF 110 receives the SIP INVITE request 302 and at 304 queries the ENUM services 112 to determine an R-URI corresponding to the partner IMS that is to ultimately receive the SIP INVITE request. The ENUM services 112 provide a response at 306 indicating the R-URI. The R-URI may indicate a domain and/or host name of the IMS servers of the partner provider.

At 308, the CSCF 110 forwards the SIP INVITE request, with the appended R-URI, to the BGCF 120. The BGCF 120 performs an action 310 of method and feature tag analysis, as described above with reference to the actions 224, 228, and 230 of FIG. 2. The BGCF 120 may also perform an action 312 of applying a codec policy, which may comprise removing one or more codec designations from the SIP INVITE request, based on capabilities of the partner IMS as indicated by the service profile 226. The BGCF may also perform an action 314 of route screening, which may comprise modifying the R-URI to add a routing indicator, corresponding to one of multiple IBCF servers of a partner IMS to which the SIP INVITE request is to be forwarded. The preferred routing of the SIP INVITE request may be determined by referencing the service profile 226, based on the SIP method and designated feature tag. For example, the partner IMS network may have an IBCF server that is intended to receive requests relating to voice communications and a different IBCF server that is intended to receive requests relating to video communications. The route screening 314 adds an indicator to the R-URI so that the SIP request will be routed to the appropriate one of these IBCF servers.

The example of FIG. 3 assumes that the method and feature tag analysis has found that the received SIP method and feature tags are supported by the partner IMS. Accordingly, at 316, the potentially modified SIP INVITE request is forwarded to the IBCF 108 of the IMS 102. At 318 the IBCF 108 forwards the potentially modified SIP INVITE request to an IBCF 320 of the partner IMS, at the network address corresponding to the R-URI.

Although not shown in FIG. 3, the partner IBCF 320 may return an SIP response to the IBCF 108, and the response may be propagated toward the left in FIG. 3 back to the entity from which the request originated.

Figure 4:
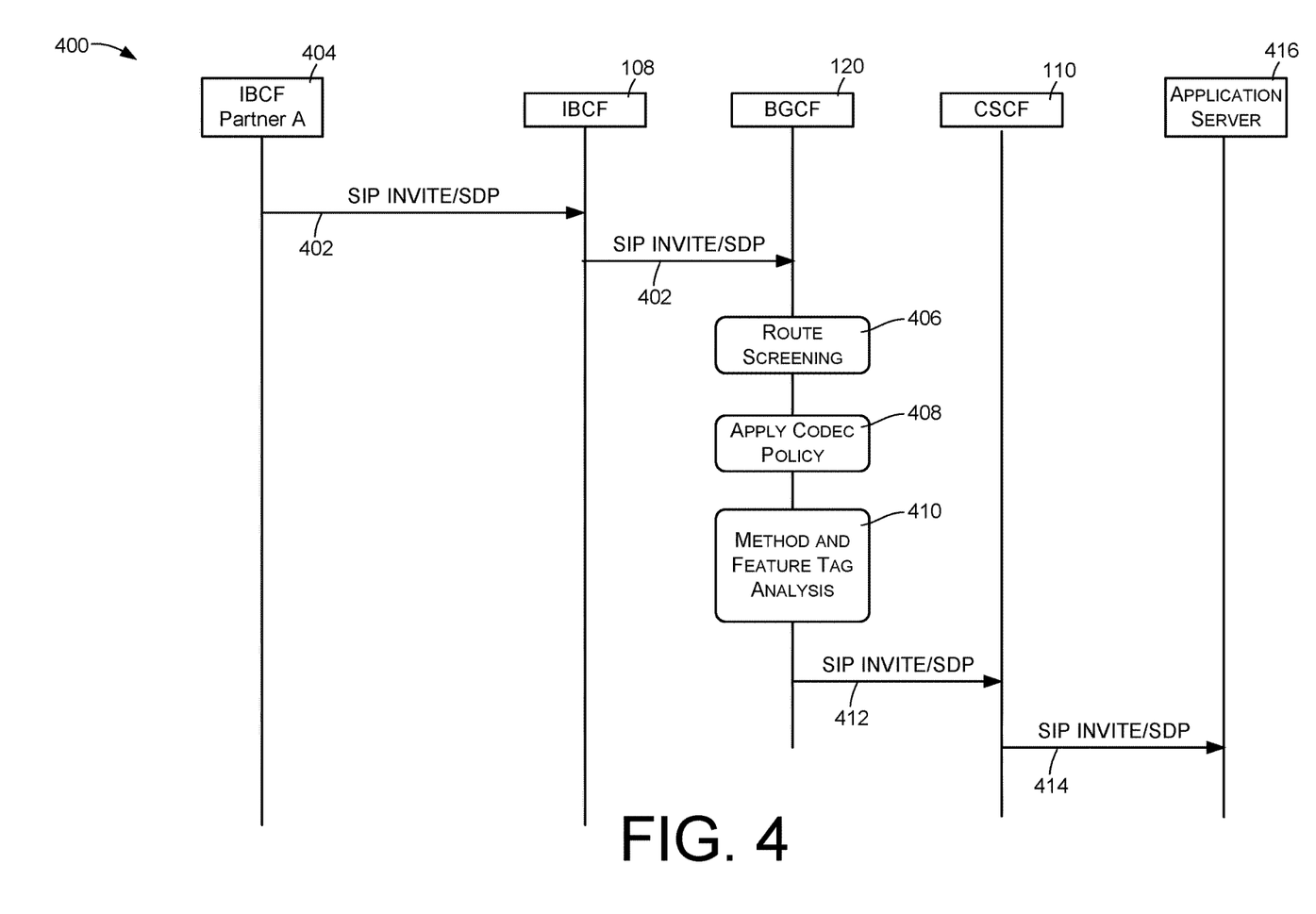
FIG. 4 is a diagram of a call flow, wherein an initial SIP request is received from another IMS network.

FIG. 4 shows an example call flow illustrating reception and forwarding of a session initiation request in the form of a SIP INVITE request 402 with an SDP message body, wherein the request 402 is received from a partner IMS 106. For example, the request 402 may be received from an IBCF 404 of a partner IMS. The request 402 is received by the IBCF 108 of the IMS 102, which forwards the request 402 to the BGCF 120.

The BGCF performs an action 406 of route screening, which may comprise adding a routing indicator to the request 402. The route indicator may specify a particular application server within the IMS 102, for example, that is to receive the request 402, and may be determined based on the host name or other identity of the IMS from which the request 402 was received. In some cases, the preferred routing may be determined by referencing the service profile 226, based on the SIP method, designated feature tag, and the IMS or external IBCF from which the request was received.

The BGCF 120 may also perform an action 312 of applying a codec policy, which may comprise removing one or more codec designations from the SIP INVITE request, based on, for example, preferred capabilities of the IMS 102.

The BGCF 120 performs an action 410 of method and feature tag analysis, as described above with reference to the actions 224, 228, and 230 of FIG. 2. Assuming that the method and feature tag specified by the request 402 are supported by the IMS 102, the BGCF 120 forwards the request to the CSCF 110 at 412. At 414, the CSCF 110 forwards the request 402 to the appropriate application server 416. The application server 416 may be determined based on the feature tag of the request, and may also be determined based on the identity of the entity from which the request was received.

The example of FIG. 4 assumes that the method and feature tag analysis has found that the received SIP method and feature tags are supported by the IMS 106.

Figure 5:
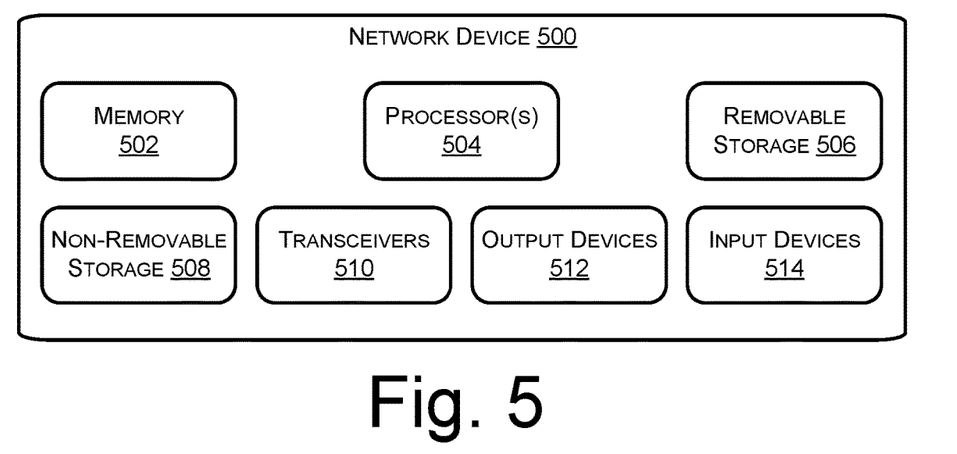
FIG. 5 is a block diagram illustrating relevant high-level components of a server device that may be used to implement various of the components described herein.

FIG. 5 illustrates a component level view of a telecommunication network device 500 capable of implementing the CSCF 110 and/or the BGCF 120 of FIG. 1. The network device 500 may, as an example, comprise a physical or virtual computer server. The network device 500 may comprise a system memory 502 storing various executable components and data for implementing the method 200 of FIG. 2. The network device 500 may further comprise processor(s) 504, a removable storage 506, a non-removable storage 508, transceivers 510, output device(s) 512, and input device(s) 514, any or all of which can be communicatively connected via a communications bus (not shown).

In various examples, the system memory 502 is volatile (such as RAM), non-volatile (such as ROM, flash memory, etc.) or some combination of the two. In some examples, the processor(s) 504 is a central processing unit (CPU), a graphics processing unit (GPU), or both CPU and GPU, or any other sort of processing unit.

The network device 500 also includes additional data storage devices (removable and/or non-removable) such as, for example, magnetic disks, optical disks, or tape. Such additional storage is illustrated in FIG. 5 by removable storage 506 and non-removable storage 508. The system memory 502, removable storage 506 and non-removable storage 508 are all examples of non-transitory computer-readable storage media.

In some examples, the transceivers 510 include any sort of transceivers known in the art. For example, transceivers 510 may include a radio transceiver that performs the function of transmitting and receiving radio frequency communications. Also, or instead, the transceivers 510 may include other wireless or wired connectors, such as Ethernet connectors or near-field antennas. The transceivers 510 may facilitate connectivity between a public network, such as a packet-switched access network (not shown), and one or more other devices of a telecommunication network.

In some examples, the output devices 512 include any sort of output devices known in the art, such as a display, speakers, a vibrating mechanism, or a tactile feedback mechanism. Output devices 512 also include ports for one or more peripheral devices, such as headphones, peripheral speakers, or a peripheral display.

In various examples, the input devices 514 include any sort of input devices known in the art. For example, the input devices 514 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
receiving, from a user equipment (UE) by a border gateway control function (BGCF) in an Internet protocol (IP) multimedia subsystem (IMS) of a first service provider, a session initiation protocol (SIP) request, wherein the SIP request corresponds to a request method and specifies a request feature tag and a recipient associated with an IMS of a second service provider, the IMS of the second service provider being external to the IMS of the first service provider;
accessing, by the BGCF in the IMS of the first service provider, a service profile associated with the second service provider, wherein the service profile specifies methods and feature tags supported by the second service provider;
comparing, by the BGCF in the IMS of the first service provider, the request method and the request feature tag to the service profile to determine whether the request method and the request feature tag are supported by the IMS of the second service provider;
in response to determining that at least one of the request method and the request feature tag are not supported by the IMS of the second service provider, rejecting, by the BGCF in the IMS of the first service provider, the SIP request by returning, to the UE, a SIP failure response; and
in response to determining that the request method and the feature tag are supported by the IMS of the second service provider, forwarding, by the BGCF, the SIP request to the IMS network of the second service provider.

2. The method of claim 1, wherein the supported methods include at least the following SIP methods: INVITE, SUBSCRIBE, OPTIONS, NOTIFY, PUBLISH, and REFER.

3. The method of claim 1, wherein the supported feature tags correspond to rich communication suite (RCS) media capabilities.

4. The method of claim 1, wherein the supported feature tags correspond to rich communication suite (RCS) media capabilities, the RCS media capabilities including one or more of: one-to-one chat, group chat, file transfer, content sharing, voice calling, video calling, social presence, video calling, geolocation exchange, service identification, notifications, or blacklisting.

5. The method of claim 1, further comprising modifying the SIP request to include a routing indicator, the routing indicator specifying where to forward the SIP request.

6. The method of claim 1, wherein in response to determining that at least one of the request method and the request feature tag are not supported, rejecting, by the BGCF, the SIP request comprises returning the SIP failure response to the originating UE without forwarding the SIP request to the IMS of the second service provider.

7. The method of claim 1, wherein accessing the service profile associated with the second service provider comprises:
determining, by at least one Call Session Control Function (CSCF) in the IMS of the first service provider, a Uniform Resource Identifier (URI) of the IMS of the second service provider based at least in part on the SIP request; and
retrieving, by the BGCF, the service profile from a service profiles database in the IMS of the first service provider, the service profile being indexed by the URI in the service profiles database.

8. A method comprising:
receiving, from a user equipment (UE) by a border gateway control function (BGCF) in an Internet protocol (IP) multimedia subsystem (IMS) of a first service provider, a session initiation protocol (SIP) request, wherein the SIP request specifies a call recipient, a request method, and a request feature tag;
identifying, by the BGCF, a second service provider associated with the call recipient;
accessing, by the BGCF, a service profile associated with the second service provider, wherein the service profile identifies one or more one or more supported methods that are supported by an IMS network of the second service provider and, for each method that is supported by the second service provider, one or more supported feature tags, the IMS network of the second service provider being external to the IMS network of the first service provider;
determining, by the BGCF, whether the specified request method is one of the supported methods identified by the service profile as being supported by the IMS network of the second service provider;
if the specified request method is not one of the supported methods, rejecting, by the BGCF, the SIP request by returning, to the UE, a SIP failure response; and
if the specified request method is one of the supported methods, determining, by the BGCF, whether the specified request feature tag is one of the supported one or more feature tags identified by the service profile,
if the specified request feature tag is not one of the supported one or more feature tags, rejecting, by the BGCF, the SIP request by returning, to the UE, the SIP failure response, and
if the specified request feature tag is one of the supported one or more feature tags, forwarding, by the BGCF, the SIP request to the IMS network of the second service provider.

9. The method of claim 8, wherein the one or more supported methods include at least the following SIP methods: INVITE, SUBSCRIBE, OPTIONS, NOTIFY, PUBLISH, and REFER.

10. The method of claim 8, wherein the feature tags correspond to rich communication suite (RCS) media capabilities, the RCS media capabilities including one or more of: one-to-one chat, group chat, file transfer, content sharing, voice calling, video calling, social presence, video calling, geolocation exchange, service identification, notifications, or blacklisting.

11. The method of claim 8, wherein:
the SIP request specifies a first designation of one or more requested codecs;
the service profile specifies a second designation of one or more supported codecs that are supported by the second service provider; and
the method further comprises modifying the first designation of the SIP request based at least in part on the second designation of one or more supported codecs.

12. The method of claim 8, further comprising modifying the SIP request to include a routing indicator, the routing indicator specifying where to forward the SIP request.

13. The method of claim 8, wherein the service profile further specifies routing information corresponding to the specified request method, the method further comprising:
determining a routing indicator based at least in part on the routing information, the routing indicator specifying where to forward the SIP request; and
modifying the SIP request to include the routing indicator.

14. The method of claim 8, wherein:
the SIP request specifies call preconditions;
the service profile indicates whether the second service provider supports the call preconditions; and
the method further comprises modifying the SIP request based at least in part on whether the second service provider supports the call preconditions.

15. A system, comprising:
one or more computing devices that implement a border gateway control function (BGCF) in a first Internet protocol (IP) multimedia subsystem (IMS) of a first telecommunications services provider; and
a service profile that specifies one or more capabilities of a second IMS of a second telecommunications services provider, the second IMS being external to the first IMS, wherein the BGCF is configured to perform actions comprising:
receiving, from a user equipment (UE), a session initiation protocol (SIP) request, wherein the SIP request indicates a recipient corresponding to the second IMS and corresponds to a request method and specifies a request feature tag;
determining, based at least in part on the service profile, whether the request method and the request feature tag are supported by the second IMS;
in response to determining that at least one of the request method and the request feature tag are not supported, rejecting the SIP request by returning, to the UE, a SIP failure response; and
in response to determining that the request method and the feature tag are supported by the second IMS, forwarding the SIP request to the second IMS.

16. The system of claim 15, wherein at least the following request methods are supported: INVITE, SUBSCRIBE, OPTIONS, NOTIFY, PUBLISH, and REFER.

17. The system of claim 15, wherein the request feature tag corresponds to one or more rich communication suite (RCS) media capabilities.

18. The system of claim 15, wherein the request feature tag corresponds to one or more rich communication suite (RCS) media capabilities, the RCS media capabilities including one or more of: one-to-one chat, group chat, file transfer, content sharing, voice calling, video calling, social presence, video calling, geolocation exchange, service identification, notifications, or blacklisting.

19. The system of claim 15, the actions further comprising modifying the SIP request to include a routing indicator, the routing indicator specifying where to forward the SIP request.

20. The method of claim 7, wherein determining the URI of the IMS of the second service provider comprises:
calling, by the CSCF, an ENUM server in the IMS of the first service provider to determine the URI of the IMS of the second service provider.

\* \* \* \* \*